Dec. 1, 1964  W. J. HODGSON, JR  3,159,696
METHOD AND APPARATUS FOR CASTING OF SHAPED ARTICLES
Filed Nov. 7, 1961
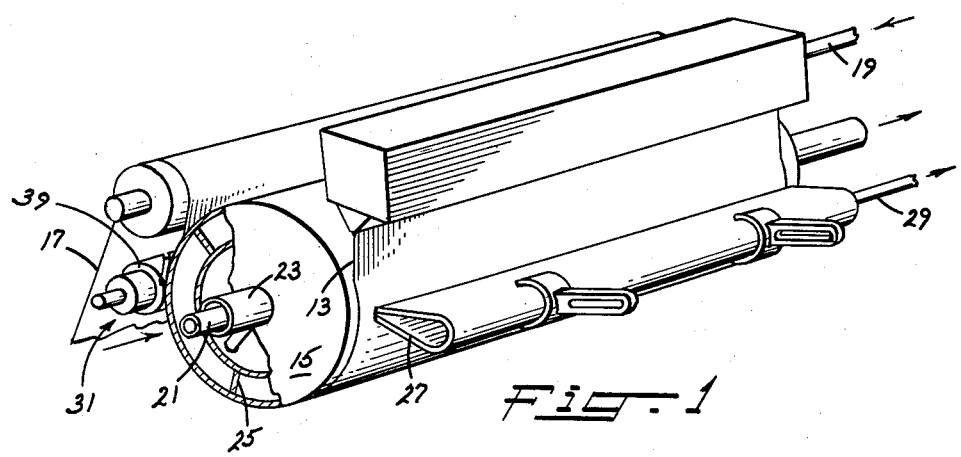
Fig. 1
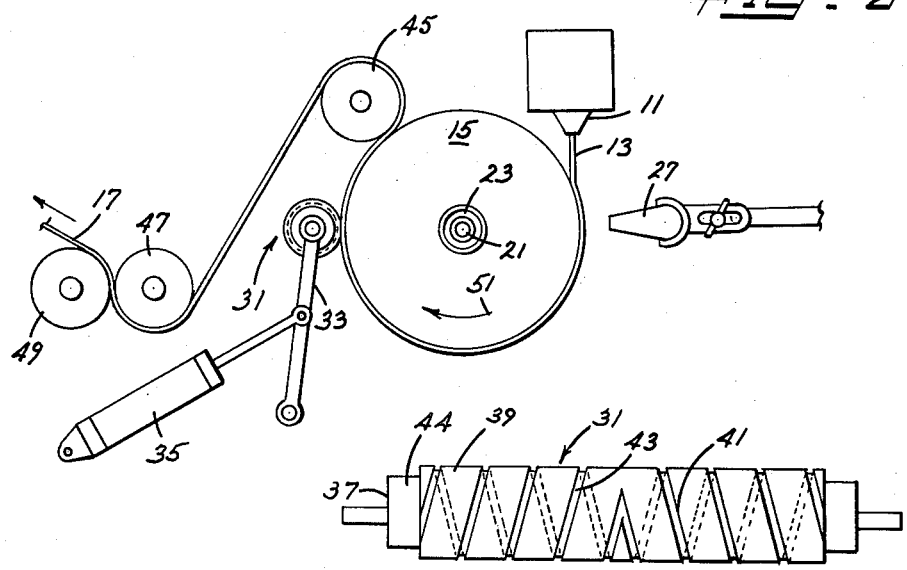
Fig. 2
Fig. 3

United States Patent Office 3,159,696
Patented Dec. 1, 1964

3,159,696
METHOD AND APPARATUS FOR CASTING OF SHAPED ARTICLES
William J. Hodgson, Jr., Boothwyn, Pa., assignor to Avisun Corporation, Philadelphia, Pa., a corporation of Delaware
Filed Nov. 7, 1961, Ser. No. 150,683
9 Claims. (Cl. 264—93)

The present invention relates to the manufacture of shaped plastic articles and more particularly to an improved method and apparatus for melt casting of polymers containing additive materials.

In the conventional method of forming film from polymeric materials, as for example from ethylene or propylene polymers, the molten polymer is extruded as a continuous shaped stream and is then rapidly cooled to provide a desired film or sheet. In a preferred procedure the shaped stream of molten polymer is received on the surface of a rotating chill drum where it is rapidly cooled to minimize crystal growth and to provide the resulting film with desired optical properties, such as a high degree of gloss and transparency. When employing such preferred procedure with polymers containing additive materials; that is, materials which are designed to provide the resulting film with certain desired physical or chemical properties which are not provided by the polymers alone, it has been found that during the cooling stage at least a portion of the additive materials separate from and collect upon the chill drum surface.

Aside from the waste of costly materias, the separation of additive materials from the polymer being cast may be so pronounced that the resulting film often fails to exhibit those properties which the additive material was intended to provide. Equally important, is that a build-up of additive materials on the chill drum surface prevents the extruded stream of polymer from making snug contact therewith so that the stream is cooled at a comparatively slow rate providing a film having translucent or hazy characteristics. An added disadvantage is that the accumulated additive materials tend to flake off from the chill drum surface in patches so that the remaining portions thereof present an irregular surface which is reflected in the surface of the film produced.

Removal of the accumulated additive materials by scrappers involves possible damage to the highly polished surface of the chill drum, and creates the added problem of uniformly removing the additive materials from the scrapper itself. More important, the removal of such accumulated additive materials in no way prevents further separation of additive materials from the molten polymer and therefore is, at most, ony a partial solution to the problem. Accordingly, the primary object of this invention is to provide a new or improved and more satisfactory method and apparatus for melt casting of polymers containing additive materials.

Another object is to provide an improved method and apparatus for melt casting of film-forming polymers without any substantial loss of additive materials therefrom.

Still another object is the provision of a method and apparatus wherein a shaped stream of molten polymer containing additive materials is rapidly cooled on a moving quenching surface and snugly pressed against such surface before being removed to prevent or minimize separation of additive materials therefrom.

A further object is the provision of a method wherein a tsream of molten polymer containing at least one additive material is cast into a film on a moving quenching member and then pressed snugly against such member to prevent or minimize the accumulation of additive materials on the surface thereof.

These and other objects and advantages of the invention will be apparent from the following description and accompanying drawing in which:

FIGURE 1 is a perspective view illustrating the apparatus of the present invention in use;
FIGURE 2 is a side view of the apparatus shown in FIGURE 1; and
FIGURE 3 is a front view of a pressure roll incorporated in the apparatus shown in FIGURES 1 and 2.

In accordance with the present invention a shaped stream of molten polymer, and particularly a polymer containing additive materials, is extruded onto the surface of a moving quench or chill member where it is rapidly cooled into a film or sheet. Before being removed or lifted away from the quenching member the film is urged into intimate contact with the surface of the chill member under a positive pressure ranging from 2 to 40 pounds per linear inch and preferably from 5 to 20 pounds per linear inch, depending upon such factors as the amount of additive materials contained within the polymer, the tendency of a particular additive material to accumulate on the chill member, and etc. As a result of the application of such pressure, additive materials which normally tend to accumulate on the surface of the chill member are retained within or uniformly on the resulting film as it is subsequently removed from the surface of the chill member.

While various types of moving quenching members may be employed in the practice of the present invention, an internally cooled rotating drum having a highly polished peripheral surface is preferred from the standpoint of simplicity and efficiency. While not essential for the satisfactory practice of the present invention, it is preferred that the casting apparatus employed also include means for impinging a controlled stream or jet of air or other inert gas onto the exposed surface of a freshly extruded stream of molten polymer so as to urge the opposing surface thereof into snug contact with the polished surface of the rotating chill drum. In this manner any tendency for air and/or other gases to travel with and collect between the chill drum surface and the extruded polymer stream is prevented or at least minimized.

The application of pressure on the cast film before removal of the same from the chill member may be achieved in a variety of ways, as for example by a sharp air blast. A roll having a resilient cover, as for example of silicon rubber, satisfactorily performs the desired function and is preferred, again from the standpoint of simplicity, economy and efficiency. Such roll is, of course, adjustably mounted to permit the pressure which is exerted on the cast film to be varied within the limits set forth above. The resilient cover of the pressure roll may be formed with circular grooves which are inclined to the roll axis, and more desirably with helical grooves which facilitate the escape of air or other gases from between the film and chill surface as the film travels into the nip formed by the pressure roll and chill drum.

As heretofore mentioned, the terminology "additive materials" refers to materials which are incorporated into the molten polymer for providing the resulting film, or at least one surface thereof, with certain desired physical or chemical properties which are not provided by the polymer alone. While the present invention is not limited to the use of any specific additive material, typical additive materials which may be employed are, for example, amides of natural fatty acids containing between 6 and 24 carbon atoms such as the "Armides" as marketed by Armour and Co., Chicago, Illinois and non-ionic fatty condensates such as "Alromine RU-100" (Geigy Chemical Co., Cranston, Rhode Island) for improving slip characteristics; antioxidants or other stabilizers, such as dilauryl dithiopropionate; antistatic agents; pigments; and etc.

With reference to the drawing for a more detailed description of the invention a molten polymer containing at least one additive material, as for example a propylene polymer containing "Armide-O" as an additive material, is extruded from a die 11 as a continuous shaped stream 13 which is received on a highly polished peripheral surface of a driven drum or roll 15 where it is cooled to provide a film or sheet 17. The die 11 is normally positioned close to the chill drum surface and includes a manifold 19 through which the molten polymer is delivered to a pair of die lips or blades which together cooperate to provide an extrusion orifice of desired size. As with conventional extrusion die constructions at least one of the die blades is adjustable to permit variation in the thickness of the extruded stream 13. The surface of the chill drum 15 is maintained at a temperature well below the melting point of the extruded polymer, and in the case of polypropylene is preferably maintained at a temperature of from 75 to 100° F. by circulating a cooling fluid, such as water, therethrough. The cooling liquid may be delivered into and discharged from the chill drum 15 through conduits 21 and 23, respectively, the latter which may also serve as a bearing for the drum 15. For maximum efficiency, the cooling liquid is channeled along the internal surface of the annular drum wall, as for example by spiral baffles as shown at 25.

As the extruded stream of molten polymer 13 approaches and is received upon the chill drum 15, its exposed surface is impinged by a stream or jet of air or other inert gas which urges the polymer stream in snug contact with the chill drum periphery, thus displacing air and/or other gaseous products which are or may tend to be trapped therebetween. The impinging jet of gas is supplied by a nozzle 27 which is substantially equal to the chill drum in length and is preferably mounted for adjustment relative to the surface thereof. The nozzle 27 is of conventional construction and includes one or more gas delivery pipes 29 and a pair of blades, at least one of which is adjustable to permit variations in the size of the nozzle discharge orifice.

With the resulting film 17 being continuously carried by the drum 15, a pressure roll 31 is engaged with the exposed surface thereof once it has solidified to such an extent that it can no longer be marked or embossed. As heretofore mentioned the roll 31 urges the film 17 into intimate contact with the chill drum surface under a pressure of from 2 to 40, and more preferably, from 5 to 20 pounds per linear inch. Under these pressure conditions, additive materials which have separated onto or tend to accumulate on the chill drum surface during the cooling of the polymer stream are returned to or prevented from separating so that no substantial loss of the same is occasioned when the film is ultimately removed from the drum. To achieve the above described purpose, the roll 31 is adjustably supported as by pivot arms 33 which in turn are actuated by hydraulic means 35.

As illustrated, the pressure roll 31 includes a rigid core 37 and an outer covering 39 of resilient material, as for example silicon rubber, which is capable of yielding under the applied load to avoid damage to the film 17. Grooves 41 and 43 of opposite hand are formed in the roll covering 39, starting substantially at the center of the roll 31 and extending to the undercut ends 44 which accommodate beads or enlarged sections formed along the film edges. Such grooves permit air and/or other gases which may be entrapped between the chill drum surface of the film 17 to travel with the film as it moves into the nip formed by the drum 15 and pressure roll 31, rather than accumulating and tending to stretch or otherwise distort the film at this area. The depth and width of the grooves should, of course, be such as to permit the escape of entrapped gases yet assure that the roll has a sufficient surface area for achieving the desired pressing of the film against the chill roll. Generally, the grooves should not occupy more than two-thirds, and preferably not more than one-half, of the surface of the pressure roll. While the dimensions of the grooves may be varied with different operating conditions, grooves having a depth of $\frac{1}{16}$" to $\frac{1}{4}$" or more and a width of $\frac{1}{4}$" to 1" or more have been found to be generally satisfactory when spaced from $\frac{1}{2}$" to $1\frac{1}{2}$" along the roll surface.

Aside from avoiding film distortion, the continuous helical channels provided by the grooves 41 and 43 cause such entrapped gases to travel laterally of the roll and escape into the surrounding atmosphere along the film edges. While helical grooves, as described above, are preferred, circular grooves extending in planes inclined to the axis of the roll 31 may be employed with satisfactory and somewhat similar results. To insure that no area of the chill drum surface travels through more than one revolution without being pressed into intimate contact with the film 17 by the pressure roll 31, grooves extending longitudinally of the roll 31 or circular grooves disposed in planes perpendicular to the roll axis should be avoided.

The tendency for air and/or other gases to be entrapped between the film and chill drum surface will, of course, be less pronounced when the freshly extruded stream of molten polymer is initially urged into snug contact with the chill drum surface, as for example by a jet of gas as described above. It has been found, however, that regardless of the measures taken to avoid the entrapment of gases between the film and chill drum surface, none has proven to be completely effective. Thus, while the remaining trapped gases may not be sufficient to prevent rapid quenching of the extruded polymer stream, its gradual accumulation at the nip formed by the chill drum 15 and smooth surfaced pressure roll is objectionable. Accordingly, for most satisfactory results it is preferred that a grooved pressure roll, as described above, be employed regardless of the particular techniques used to secure rapid quenching of the polymer stream.

After traveling beyond the pressure roll 31 the film is removed from the chill drum 15, passed over a conventional take-off roll 45, and then advanced by nip rolls 47 and 49 to further processing stages or to a conventional take-up means, not shown.

In practicing the method of the present invention, the die 11 is positioned to place its blades as close as possible to the chill drum periphery so that the extruded polymer stream travels only a short distance through the surrounding atmosphere. With the drum 15 being rotated in the direction indicated by the arrow 51 and with a cooling fluid being circulated along the internal surface thereof, molten polymer, containing additive materials, is extruded downwardly from the die 11 and onto the surface of the drum 15 as a continuous stream 13. The plane of the molten stream 13 is almost tangent to the periphery of the drum 15 to thus avoid any drastic changes in travel as the stream engages with the chill drum surface. As the extruded stream contacts with the surface of the chill drum 15, a jet of air or other inert gas issuing from the nozzle 27 impinges against the exposed surface of the polymer stream 13 and thereby urges its opposite surface snugly against the chill drum. The cooled surface of the chill drum 15, combined with the snug contact facilitated by the impinging air jet, cause the extruded stream of molten polymer to be rapidly and uniformly quenched thus limiting the amount of material which is present in crystal form, as well as the size of the crystallite grains, to provide the film 17 with a high degree of clarity and gloss.

With the continued rotation of the chill drum 15, the now completely quenched film 17 is urged into intimate contact with the chill drum surface by the pressure roll 31. Under the influence of the hydraulic means 35, the roll 31 exerts a pressure of from 2 to 40 pounds per linear inch, and more preferably from 5 to 20 pounds per linear inch, on the film 17 as it travels between the pressure roll and chill drum. As a result of this applied pressure, additive materials which have or tend to collect on the chill drum surface are returned to or prevented from separating from the film so that loss of additive materials and accumulation of the same on the chill drum surface is avoided. A complete explanation for the results achieved is not presently available. It does appear, however, that under the pressure applied to the film, additive materials which may have collected on the chill drum have a greater affinity for the film than the chill drum surface, or perhaps are more firmly embedded within the film itself so that they remain with the film even after the pressure is removed.

The film 17 is subsequently removed from the chill drum 15, passed over the take-off roll 45 and then advanced to further processing stages by nip rolls 47 and 49. As heretofore mentioned, the take-off roll 45 is a conventional construction and serves merely to facilitate a smooth removal of the film 17 from the chill drum surface.

The following example is presented to further illustrate the operation and merits of the above described method.

*Example I*

Employing an apparatus as illustrated in the accompanying drawing, molten polypropylene containing 0.1% of "Armide–O," by weight, was heated to a temperature of from 470 to 480° F. and was extruded through an elongated die orifice 10 mils in width and delivered onto a highly polished chill drum located about 1″ below the die orifice. The chill drum was maintained at a temperature of about 80° F. by circulating water therethrough and was rotated at a speed of about 200 feet per minute. The extruded stream of molten polypropylene was pressed snugly against the chill drum surfaces by a jet of air issuing from a nozzle extending across the entire width of the extruded stream, the nozzle having an orifice of 45 mils in width and located about ½″ from the chill drum surface. The air issued from the nozzle under a pressure equivalent to .07 inch of water and thus at a temperature of about 100° F.

Approximately 4″ after the exposed surface of the polymer stream had completely solidified, the resulting film was urged into more intimate contact with the chill drum surface by means of a roll which exerted a pressure on the film of about 10 pounds per linear inch. This pressure roll had a covering of silicon rubber of 40 Shore A Durometer and was formed with helical grooves, as heretofore described, spaced at ½″ intervals and having a depth and width of 1/16″ and 3/8″, respectively.

The film produced under the above operating conditions possessed good optical properties, having a haze value of about 1.8%, and higher slip levels than those exhibited by polypropylene containing no "Armide–O." As a result of the pressure applied to the film, separation and accumulation of "Armide–O" was avoided since patches of the same, in any significant amount could not be detected on either the chill drum surface or the surface of the film which was in contact therewith.

For purposes of comparison, a second polypropylene film was produced employed the same film-forming material, casting procedure and operating conditions as described above, with the exception that the solidified film was not subjected to any pressure prior to being removed from the chill drum. The optical properties of this film was similar to that described above, except in those areas which contained patches or accumulation of "Armide–O." In view of these patches of "Armide–O" on the film surface, non-uniform slip characteristics were exhibited by this last described film. Accumulations of "Armide–O" were also found on the chill drum and presented a non-uniform surface which apparently was due to the flaking of "Armide–O" during the process. After ¼ hour of continued operation, the build-up of "Armide–O" on the chill roll was excessive, thus requiring a shut-down of the apparatus for cleaning.

It is to be understood that changes and variations may be made without departing from the spirit and scope of the invention as defined in the appended claims.

I claim:

1. A method of forming transparent films including the steps of providing a shaped stream of molten thermoplastic polymer containing at least one additive material, contacting one surface of the shaped stream of molten polymer with a moving chill surface to rapidly cool the stream and provide a solid film, directing a stream of gas against the exposed surface of the shaped stream of molten polymer substantially along its entire width, forcibly engaging a non-continuous resilient surface against and transversely across the exposed surface of the solid film to thereby urge the film against the chill surface under pressure, releasing the pressure from the film and removing the film from the chill surface.

2. A method as defined in claim 1 wherein the solid film is engaged by an endless resilient surface having helical grooves of opposite hand extending from substantially the center to the ends thereof to prevent gases which may be entrapped between the film and chill surface from accumulating and distorting the film as it is urged against the chill surface under pressure.

3. A method of forming transparent films having improved slip characteristics including the steps of providing a shaped stream of molten polypropylene containing as an additive from about 0.075 to 0.125% by weight, of an amide of a natural fatty acid containing between 6 and 24 carbon atoms, contacting one surface of the shaped stream of molten polypropylene with a moving chill surface to rapidly cool the stream and provide a solid film, exerting a pressure transversely across the exposed surface of the solid film while the film remains in continuous contact with the moving chill surface to thereby prevent any substantial accumulation of the additive on the chill surface, releasing the pressure from the film and then removing the film from the chill surface.

4. Apparatus for making continuous films from thermoplastic polymers containing at least one additive material including a chill surface, means for moving the chill surface at a uniform rate, means for extruding a molten polymer containing at least one additive material onto said chill surface as a continuous shaped stream, means for maintaining the chill surface at a predetermined temperature for rapidly cooling the shaped stream of polymer into a solid film, means including a roll provided with an outer covering of resilient material having a non-continuous peripheral surface for engaging with the film and urging the same under pressure into more intimate contact with the chill surface as it travels therewith to thereby avoid any substantial accumulation of additive materials thereon, and means for removing the film from the chill surface.

5. Apparatus for making continuous films from thermoplastic polymers containing at least one additive material including a chill drum, means for rotating the chill drum at a uniform rate, means for extruding a molten polymer containing at least one additive material onto said chill drum as a continuous shaped stream, means for urging the stream of molten polymer snugly against the chill drum surface to displace from between the extruded stream and chill drum, means for maintaining the surface of the chill drum at a predetermined temperature for rapidly cooling the shaped stream of polymer into a solid film, a roll positioned to engage with the exposed surface of the film as it travels with the chill drum, means for urging said roll against the film under pressure to provide for more intimate contact between the film and chill drum to thereby avoid deposition of additive material on the drum surface, said roll including a resilient outer covering having grooves formed along the periphery thereof, and means for removing the film from said drum.

6. Apparatus as defined in claim 5 wherein the outer covering of said roll is provided with helical grooves of opposite hand which extend from substantially the center of the roll to the opposite ends thereof.

7. Apparatus as defined in claim 5 wherein said means for urging the stream of polymer against the chill drum surface includes a nozzle for directing a gaseous medium under pressure against the exposed surface of the polymer stream.

8. Apparatus for making continuous films from thermoplastic polymers containing at least one additive material including a chill surface, means for moving the chill surface at a uniform rate, means for extruding a molten polymer containing at least one additive material onto said chill surface as a continuous shaped stream, means for maintaining the chill surface at a predetermined temperature for rapidly cooling the shaped stream of polymer into a solid film, means including a roll for engaging with the film and urging the same under pressure into more intimate contact with the chill surface as it travels therewith to thereby avoid any substantial accumulation of additive materials thereon, said roll including an outer covering of resilient material which is formed with peripheral helical grooves of opposite pitch extending from substantially the center to the opposite ends thereof, and means for removing the film from the chill surface.

9. Apparatus for making continuous films from thermoplastic polymers containing at least one additive material including a chill surface, means for moving the chill surface at a uniform rate, means for extruding a molten polymer containing at least one additive material onto said chill surface as a continuous shaped stream, means for maintaining the chill surface at a predetermined temperature, means for urging the shaped stream of molten polymer snugly against the chill surface to effect rapid solidification thereof into a solid film, means including a roll for engaging with the film and urging the same under pressure into more intimate contact with the chill surface as it travels therewith to thereby avoid any substantial accumulation of additive materials thereon, and means for removing the film from the chill surface.

References Cited in the file of this patent

UNITED STATES PATENTS

| | | |
|---|---|---|
| 2,212,770 | Foster | Aug. 27, 1940 |
| 2,398,435 | Marks | Apr. 16, 1946 |
| 2,582,294 | Stober | Jan. 15, 1952 |
| 3,056,164 | Reichel et al. | Oct. 2, 1962 |